July 5, 1955
C. A. FORTIN
2,712,322
FILLING VALVE FOR LIGHTERS USING COMPRESSED FUEL
Filed Feb. 11, 1953
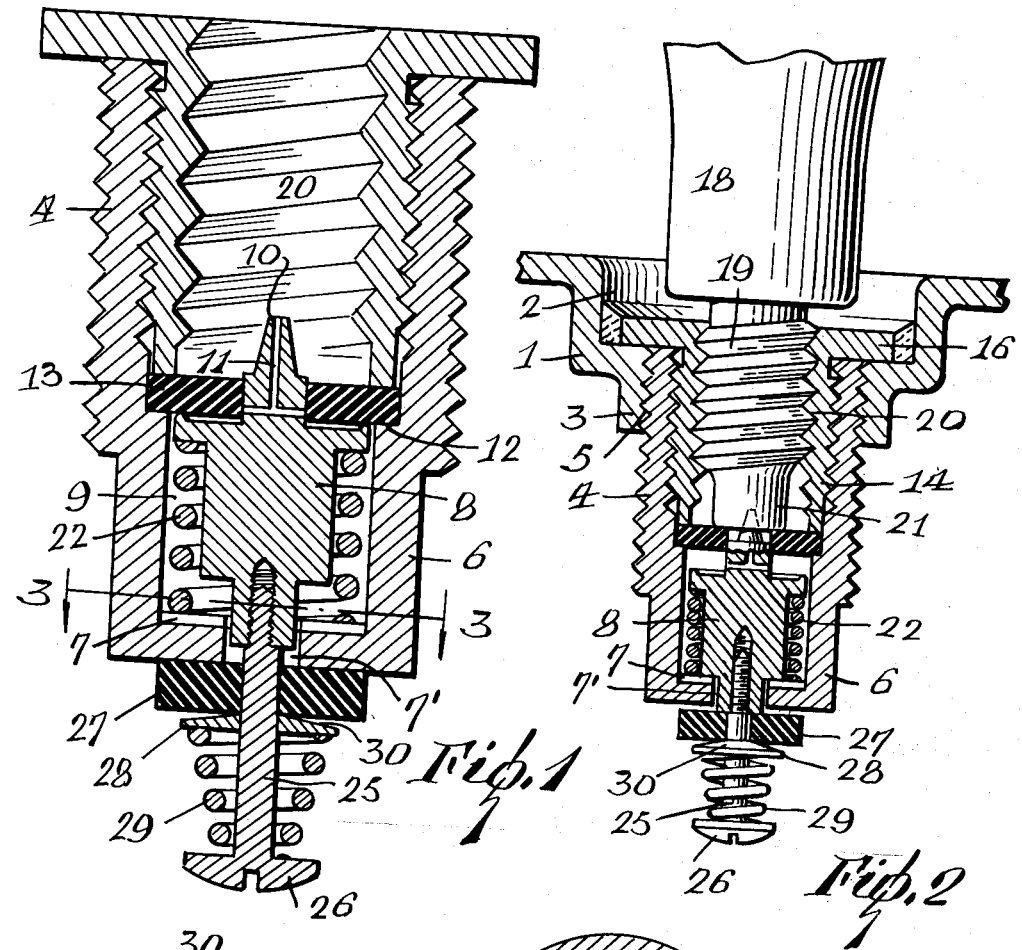
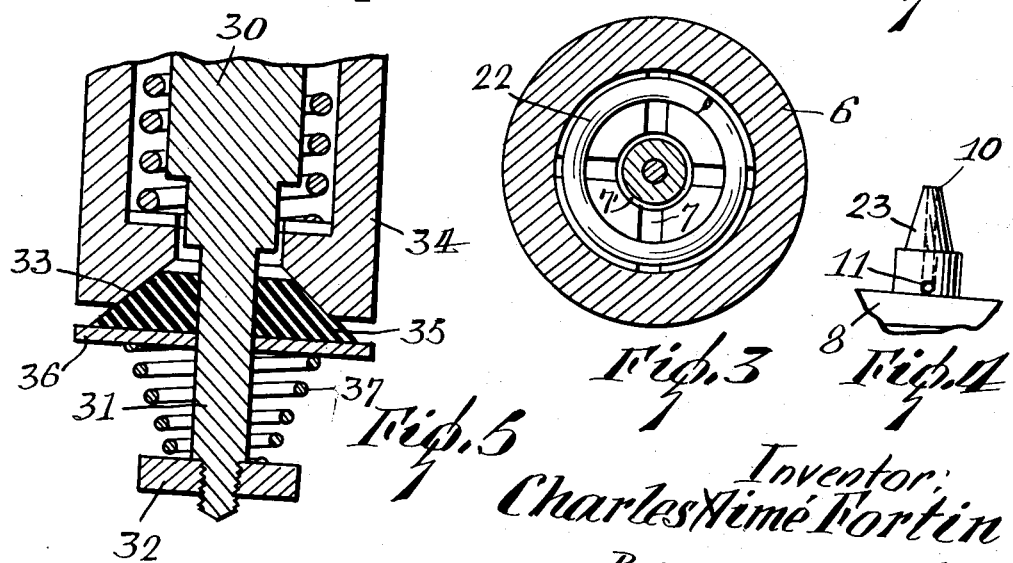
Inventor:
Charles Aimé Fortin

United States Patent Office 2,712,322
Patented July 5, 1955

2,712,322
FILLING VALVE FOR LIGHTERS USING COMPRESSED FUEL

Charles Aimé Fortin, Montreal, Quebec, Canada, assignor to Presto Lighters Limited, Montreal, Quebec, Canada Application February 11, 1953, Serial No. 336,411

4 Claims. (Cl. 137—318)

This application is a continuation-in-part of my copending application, Serial Number 280,320, filed April 3, 1952, now abandoned.

The invention pertains to a novel filling valve for lighters using compressed fuel such as butane gas. The lighter has a fuel container which is charged with the gas, usually compressed to liquid form, by means of a cartridge.

The principal object of the invention is to provide a valve which is opened by means of the cartridge and which then pierces the cartridge to permit the fuel to flow into the lighter. Another object of the invention is to provide a simple and positive means for this purpose.

A more particular object of the invention is to provide a double closure in the valve, for more secure closing when the cartridge is withdrawn. The instant valve, as in the earlier application, includes a spring-backed slide that seats against an internal gasket to obstruct a passage in a part of the plug that enters the gasket. This part is pushed out of the gasket by the cartridge to permit flow. The outlet is formed in the housing at the end of the slide opposite the aforementioned part.

The additional closure in this invention is provided at the outlet. For this purpose, a stem is extended from the slide through the outlet and is fitted with a closure for the outlet. The closure is preferably a gasket fixed on the stem and bearing against the outlet under the action of a spring on the stem. Means are provided for making an especially tight engagement of the gasket against the outlet.

The invention is fully disclosed by way of example in the following description and in the accompanying drawings in which:

Figure 1 is a longitudinal section of the closed valve;
Figure 2 is a similar section of the open valve, applied to a cartridge;
Figure 3 is a section on the line 3—3 of Figure 1;
Figure 4 is an elevation of a detail; and
Figure 5 is a section of a modification.

Reference to these views will now be made by use of like characters which are employed to designate corresponding parts throughout.

In Figure 2 is shown the bottom 1 of the gas container in the lighter. The lighter is shown inverted for filling. The bottom 1 is formed with an opening 2 around which is a normally upwardly extending wall 3.

The valve includes a tubular housing 4 which is threaded at 5 into the wall 3 and disposed within the gas container. It will be understood that the internal parts may be assembled therein before the housing is mounted in position.

The exposed end wall 6 of the housing 4 is formed with a pair of crossed grooves 7 for a purpose that will presently be described and an intake port 7' is formed through this wall and in communication with the grooves at their intersection. Adjacent to this end wall, the housing 4 contains a loosely mounted plug or slide 8 spaced at 9 from the wall of the housing. The inner end of the plug is formed with a sharp tip or needle 10 having a T-shaped passage 11 extending from its free end through the lateral wall. The housing 4 has an internal shoulder 12 supporting a rubber gasket 13 which surrounds the tip 10 and normally closes the T-passage at its head.

A tube 14 is screwed into the housing 4 from the opening 2 and bears against the gasket 13 to compress it. At the opening 2 the tube 14 has an outward flange 16 bearing upon the wall 3 and fitting tightly against the inner lateral wall of the member 1.

The fuel to be charged into the container 1 is stored in a cartridge 18 in liquid form under air pressure. At atmospheric pressure the liquid vaporizes and is usually in the form of butane gas. The cartridge is formed with a threaded nipple 19 which screws into the tapped inner wall 20 of the tube 14. The free end 21 of the nipple 19 is hard enough to push the plug 8 axially against a surrounding coil spring 22, as the nipple is screwed into the tube 14. On further pressure the sharp tip 10 punctures the end 21. It will be understood in this connection that the drawing shows the device several times actual size.

The tip 10 punctures the nipple 19, and the head of the T-passage 11 is pushed below the gasket 13. The liquid in the cartridge thus drips into the space 9 surrounding the plug and through the grooves 7 and the port 7' into the container 1. When the cartridge 18 is removed, the plug returns to closing position against the gasket 13. If the plug engages the wall of the housing 4 at one side to obstruct one of the grooves 7, the other groove will still remain operative.

In the outer end of the plug 8 is screwed a stem 25 having a head 26 at its outer end. A rubber gasket 27 secured on the stem is held against the opening 7' by a disk 28 backed by a spring 29, both on the stem 25. The disk has a conical surface 30 engaging the gasket 27, so that the gasket is arched in the opening 27' to seat firmly against its edge. When the plug 8 is unseated as in Figure 2, the gasket 27 also unseats to permit flow of gas into the lighter. However, when the pressure on the tip 10 is removed, there is a dual obstruction in the flow path at the gaskets 13 and 27.

In the modification shown in Figure 5, the plug 30 has an integral stem 31 on which is screwed a head 32. The outlet 33 from the housing 34 is conical and is normally closed by a similarly shaped gasket 35 on the stem. A disk 36 bears against the gasket 35 under the action of a spring 37 also on the stem 31.

Although specific embodiments of the invention have been illustrated and described, it will be understood that various alterations in the details of construction may be made without departing from the scope of the invention as indicated by the appended claims.

What I claim is:

1. A filling valve comprising a housing, a gasket mounted across said housing, a slide loosely mounted in said housing adjacent to the free end thereof, a spring between said end and said slide and normally holding said slide against said gasket, said slide having a sharp tip passing through said gasket, said tip having an angular passage from its free extremity through the lateral wall thereof, the lateral end of said passage being normally closed against the inner wall of said gasket, said tip being tapered at its free extremity, whereby to become spaced from said inner wall on pressure of said slide against said spring, the free end of said housing having an outlet therethrough, a stem extending from said slide loosely through said outlet, a gasket on said stem and normally bearing against said outlet, a head on the outer end of said stem, and a spring between said head and gasket.

2. A filling valve comprising a housing, a gasket mounted across said housing, a slide loosely mounted in said housing adjacent to the free end thereof, a spring between said end and said slide and normally holding said slide against said gasket, said slide having a sharp tip passing through said gasket, said tip having an angular passage from its free extremity through the lateral wall thereof, the lateral end of said passage being normally closed against the inner wall of said gasket, said tip being tapered at its free extremity, whereby to become spaced from said inner wall on pressure of said slide against said spring, the free end of said housing having an outlet therethrough, a stem extending from said slide loosely through said outlet, a gasket on said stem and normally bearing against said outlet, a head on the outer end of said stem, a disk on said stem at the outer surface of said gasket, said disk having a conical surface bearing against said gasket, and a spring between said head and disk.

3. A filling valve comprising a housing, a gasket mounted across said housing, a slide loosely mounted in said housing adjacent to the free end thereof, a spring between said end and said slide and normally holding said slide against said gasket, said slide having a sharp tip passing through said gasket, said tip having an angular passage from its free extremity through the lateral wall thereof, the lateral end of said passage being normally closed against the inner wall of said gasket, said tip being tapered at its free extremity, whereby to become spaced from said inner wall on pressure of said slide against said spring, the free end of said housing having an outlet therethrough, said outlet being conical, a stem extending from said slide loosely through said outlet, and a conical gasket secured on said stem and adapted to fit in said outlet.

4. A filling valve comprising a housing, a gasket mounted across said housing, a slide loosely mounted in said housing adjacent to the free end thereof, a spring between said end and said slide and normally holding said slide against said gasket, said slide having a sharp tip passing through said gasket, said tip having an angular passage from its free extremity through the lateral wall thereof, the lateral end of said passage being normally closed against the inner wall of said gasket, said tip being tapered at its free extremity, whereby to become spaced from said inner wall on pressure of said slide against said spring, the free end of said housing having an outlet therethrough, said outlet being conical, a stem extending from said slide loosely through said outlet, and a conical gasket on said stem and adapted to fit in said outlet, a head on the outer end of said stem, and a spring between said head and gasket.

References Cited in the file of this patent
UNITED STATES PATENTS

| | | |
|---|---|---|
| 1,212,640 | Hilding | Jan. 16, 1917 |
| 2,047,096 | Brewer | July 7, 1936 |